US012586692B2

(12) United States Patent
Eder et al.

(10) Patent No.: US 12,586,692 B2
(45) Date of Patent: Mar. 24, 2026

(54) X-RAY PROTECTIVE GARMENT

(71) Applicant: MAVIG GMBH, Munich (DE)

(72) Inventors: Heinrich Eder, Munich (DE); Barbara Ballsieper, Munich (DE)

(73) Assignee: MAVIG GMBH, Munich (DE)

( * ) Notice: Subject to any disclaimer, the term of this patent is extended or adjusted under 35 U.S.C. 154(b) by 341 days.

(21) Appl. No.: 18/033,465

(22) PCT Filed: Oct. 22, 2021

(86) PCT No.: PCT/EP2021/079312
§ 371 (c)(1),
(2) Date: Apr. 24, 2023

(87) PCT Pub. No.: WO2022/090072
PCT Pub. Date: May 5, 2022

(65) Prior Publication Data

US 2023/0395275 A1 Dec. 7, 2023

(30) Foreign Application Priority Data

Oct. 26, 2020 (DE) ......................... 102020213446.4

(51) Int. Cl.
*G21F 3/03* (2006.01)

(52) U.S. Cl.
CPC ..................................... *G21F 3/03* (2013.01)

(58) Field of Classification Search
CPC ........................................................ G21F 3/03
See application file for complete search history.

(56) References Cited

U.S. PATENT DOCUMENTS 3,310,053 A 3/1967 Greenwood
4,196,355 A 4/1980 Maine
10,276,273 B2 4/2019 Milstein et al.
2010/0163758 A1 7/2010 Kirschenbaum
2016/0158082 A1 * 6/2016 Gainor .................... A61G 7/05
2017/0076826 A1 3/2017 Karasina
2019/0027262 A1 1/2019 Yun et al.
2019/0043628 A1 2/2019 Milstein et al.

FOREIGN PATENT DOCUMENTS

DE 1762142 U 2/1958
EP 1052652 B1 8/2009

OTHER PUBLICATIONS

International Search Report dated Feb. 2, 2022 issued in PCT/EP2021/079312.

* cited by examiner

*Primary Examiner* — Nicole M Ippolito
(74) *Attorney, Agent, or Firm* — Scully, Scott, Murphy & Presser, P.C.

(57) ABSTRACT

An X-ray protective garment for protecting a user against X-rays emitted by an X-ray source, wherein the X-ray protective garment comprises: a first X-ray protective garment with a first X-ray protective material having a first lead equivalent value; and a second X-ray protective garment with a second X-ray protective material having a second lead equivalent value. The second X-ray protective garment overlaps the first X-ray protective garment in a predetermined area. The first and second lead equivalent values in addition provide a predetermined protection against X-rays in the predetermined overlapping area.

10 Claims, 2 Drawing Sheets

X-RAY PROTECTIVE GARMENT

Figure 1:
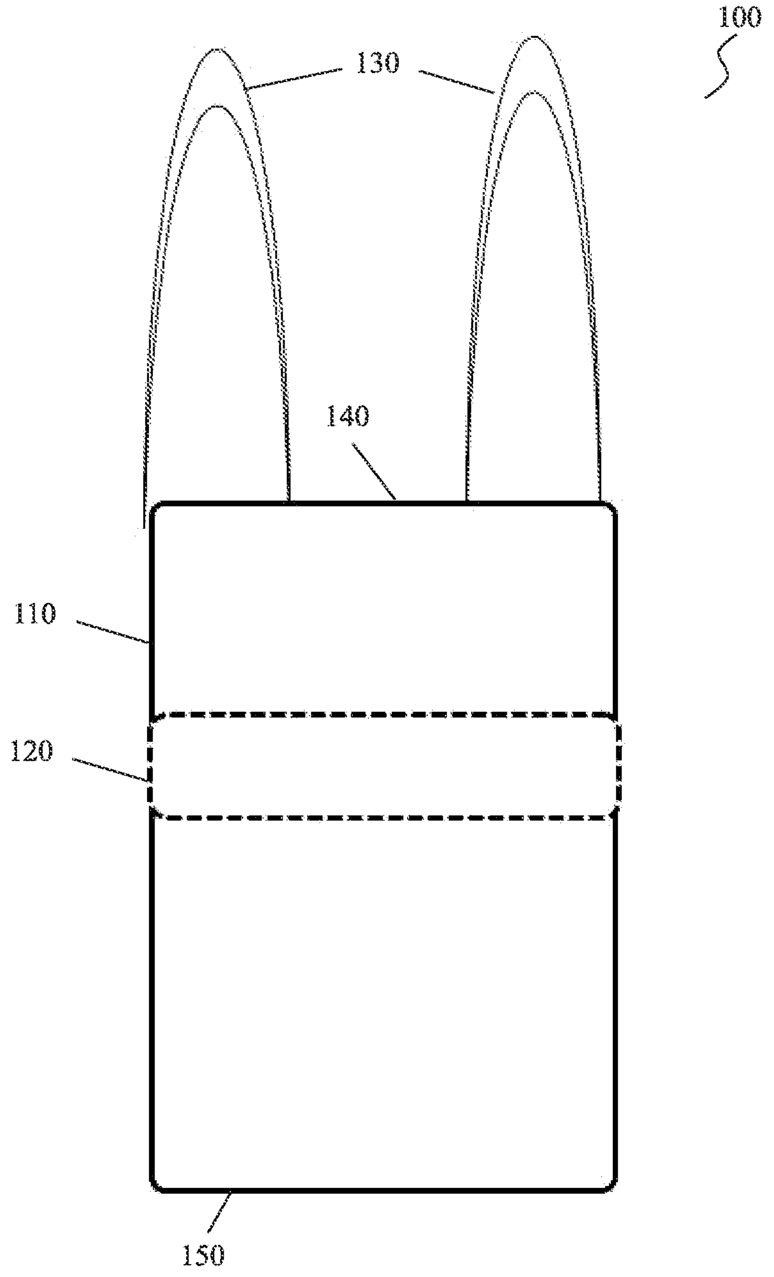

The present invention relates to an X-ray protective garment, particularly for protecting a user from X-rays emitted by an X-ray source.

In medical X-ray applications, X-ray protective garments are used, e.g., by the staff (examiners, surgeons, assistants) in order to keep the body dose low.

The conventional concept is substantially based on a more or less uniform coverage of the entire body from the neck to the knees. The protection levels usually correspond to 0.25/0.35/0.50 mm lead or lead equivalent. The lead equivalent value is determined according to the "International Electrotechnical Commission IEC. Protective devices against diagnostic medical X-radiation. IEC 61331 Part 1: Determination of attenuation properties of materials (2014)" standard.

Protection aprons with 0.35 and 0.50 mm Pb are most commonly used. Depending on body size and materials used, these aprons weigh from about 5 to 9 kg, particularly in the version with coverage of the front and back of the body. Due to the relatively high weight of the aprons, the wearing comfort is low.

Furthermore, protective garment subjects the user to high physical stress due to the high static load associated with the vapor impermeability of the protective garment, which may also affect the quality of work and/or lead to diseases of the musculoskeletal system.

Various X-ray garments that individually protect certain regions (body regions) of the user are known from the prior art. U.S. Pat. No. 3,310,053 relates to undergarments with X-ray protection and particularly to undergarments with support characteristics and other undergarments having gamma radiation protection in specific selected areas.

U.S. Pat. No. 10,276,273 B2 relates to the protection against ionizing radiation and particularly to a radiation protection device and a radiation protection method for use in space. In particular, a device for protection of a body from radiation is provided, said device comprising at least one flexible garment. Each section of the flexible garment is configured to shield a region of a surface of the body.

US 2019/0027262 A1 relates to a radiation-shielding garment for limiting the radiation exposure of radiographers and assistants at the time of radiography by using a lightweight lead-free sheet shielding X-rays, the radiation-shielding garment including: a top main body including a torso portion; and a shielding sheet, at least a part thereof being capable of being coupled to or detached from the top main body using attachment and detachment means.

US 2019/0043628 A1 relates to a lightweight radiation protection panel which consists of a radiation protection layer and a flexible material. The radiation protection layer comprises a plurality of shielding material distributed in repeated and adjacent units of geometrical shapes, the lightweight radiation protection panel being able to be embodied in a wearable garment providing flexibility.

EP 1 052 652 B1 relates to radiation protection consisting of a lower apron and an upper apron, wherein the lower and upper aprons both overlap the front region, the lead equivalent value in the front region thus being doubled compared to the back region.

However, all of the aforementioned prior art solutions have the aforementioned problems. In particular, the weight of the apron(s) of the prior art is high and may thus have a low wearing comfort for the user.

The present invention is based on the object of providing an improved X-ray protective garment compared to the prior art. In particular, it is an object of the invention to provide sufficient protection against X-rays at a low weight.

This object is achieved by the features of the independent claims. The dependent claims relate to further aspects of the invention.

According to an aspect of the present invention, an X-ray protective garment is provided for protecting a user from X-rays emitted by an X-ray source. The X-ray protective garment comprises a first X-ray protective garment comprising a first X-ray protective material having a first lead equivalent value, and a second X-ray protective garment comprising a second X-ray protective material having a second lead equivalent value. The second x-ray protective garment overlaps the first x-ray protective garment in a predetermined area. The first and second lead equivalent values, when added together, provide predetermined protection against X-rays in the predetermined overlapping area.

The first X-ray protective garment may be referred to as inner apron (apron close to the body) and the second X-ray protective garment may be referred to as outer apron (apron far from the body).

Hence, at least one part of the second X-ray protective garment overlaps the first X-ray protective garment, thus forming the overlapping area mentioned previously.

The first and/or second X-ray protective garment may each consist of one single or a plurality of layers.

The first lead equivalent value may be smaller than, preferably greater than or equal to, the second lead equivalent value, wherein the first lead equivalent value is preferably Pb 0.10 mm to Pb 1.00 mm and the second lead equivalent value is preferably Pb 0.10 mm to Pb 0.50 mm, wherein the first lead equivalent value is particularly preferably Pb 0.175 mm or Pb 0.25 mm and the second lead equivalent value is particularly preferably Pb 0.25 mm.

The first and/or second X-ray protective garment preferably covers the following areas and/or organs of the users: the intestine and/or the stomach and/or the urinary bladder and/or the gonads and/or the bone marrow and/or the liver and/or the mammary glands and/or the sternum and/or the thyroid gland of the user and/or the lungs and/or the esophagus and/or the shoulder joints and/or the bases of the upper arm, preferably at least on the front side of the user.

Particularly preferably, the first and second X-ray protective garments cover at least the aforementioned regions and/or organs of the user. Thus, increased protection against X-ray radiation may be achieved for the aforementioned organs/body regions of the user which are particularly sensitive to radiation, and, at the same time, less protection against X-ray radiation may be provided for the less radiation-sensitive body parts of the user. In this way, the weight of the X-ray protective garments may be reduced.

The first X-ray protective garment may cover at least a region from the gonads to the lower base of the chest or across a user's chest, wherein the first X-ray protective garment preferably further covers the region of the thyroid gland and/or the region of the shoulder joint and upper arm of the user.

The regions and/or organs of the user covered by the first and second X-ray protective garments preferably correspond to the predetermined overlapping area.

The region covered by the first X-ray protective garment preferably corresponds to the predetermined overlapping area.

The second X-ray protective garment may cover at least a region from the sternum to the knees or a region from the sternum to the gonads or a region from the sternum to a region between the gonads and the knees or a region from the upper abdomen to the gonads or a region from the chest to the gonads of the user, wherein the second X-ray protective garment preferably additionally covers a region from the thyroid gland to the sternum of the user.

The gonads are located below the pubic bone in male users and thereabove in female users. Thus, when gonads are referred to in the context of the present invention, the pubic bone may or may not be included. However, it is preferred that the corresponding X-ray protective garment covers at least the pubic bone or at least the gonads (in the case of a male user).

As an alternative to reference to the gonads, the respective X-ray protective garment may extend at least 10 cm below the pubic bone.

The first and/or second X-ray protective garment may comprise uniform or different zones with uniform or different lead equivalent values.

The second X-ray protective garment may comprise a uniform lead equivalent value, wherein preferably at least one of the zones corresponds to the predetermined overlapping area.

The predetermined overlapping area is disposed preferably on the front side of the user, wherein the second X-ray protective garment and/or the first X-ray protective garment preferably each covers at least 50%, particularly preferably at least 60%, of the girth of the front side of the user.

The second X-ray protective garment may only partially overlap or substantially completely overlap the first X-ray protective garment.

The predetermined overlapping area may correspond to at least one region from the pubic bone or the gonads to the sternum of the user.

The X-ray protective garment may comprise one or a plurality of first support devices configured to support the weight of the first X-ray protective garment on the user's body, preferably on the user's shoulder and/or waist or hip.

The second X-ray protective garment may comprise one or a plurality of second support devices configured to support the weight of the second X-ray protective garment on the user's body, preferably on the user's shoulder and/or waist or hip.

The first and/or second support device may, e.g., be a stretch belt which supports the weight on the user's waist or hip.

The first and/or second support device may further be, e.g., a shoulder belt which supports the weight on the user's shoulder.

The second X-ray protective garment and the first X-ray protective garment may be configured as two separate parts, i.e., the first and second X-ray protective garments are not configured integrally.

The second X-ray protective garment is preferably separably connected to the first X-ray protective garment, preferably with a hook-and-loop connection or a zipper connection or a push-button connection.

At the back of the user, the second X-ray protective garment and/or the first X-ray protective garment may be completely or partially free from X-ray protective material.

The X-ray protective garment thus comprises, preferably in the overlapping area, protection from the combination of the protective effects of the first and second X-ray protective garments and, in the non-overlapping area, a simple protective effect in accordance with the protective effect of the first or second X-ray protective garments.

If the first and second X-ray protective garments each have the same lead equivalent value, the X-ray protective garment comprises an increased protection in the overlapping area compared to the non-overlapping area.

In particular, extensive calculations with the Monte Carlo method using the ICRP reference phantom as a female user phantom have shown that the radiation exposure of the physician during examination of the patient or during interventions does not affect the whole body equally but is rather concentrated locally.

In the vast majority of cases, the patient lies on the X-ray table during X-ray application. This applies to almost all interventions and angiographies. Only in bronchoscopy, e.g., does standing application occur.

With the patient lying down, exposure occurs primarily in the region of the abdomen of the physician standing next to the patient. The abdomen also contains most of the radiation-sensitive organs and/or tissues, such as the intestine/stomach/urinary bladder/gonads as well as the red bone marrow in the pelvis/lumbar spine region. Table 1 below shows the proportions to which each organ contributes to the user's total dose (effective dose) when they are wearing a uniform apron with 0.25 mm lead equivalent. The organs marked with bold letters and numbers are all located in the abdomen. A realistic arrangement of the patient lying down and the examiner standing 30 cm away has been assumed for the calculation.

TABLE 1

Proportions of organ doses in examiner's total dose with patient lying down

| Orientation of examiner: ROT30° 100 kV | Tissue weight factor $w_T$ | Contribution to effective dose |
|---|---|---|
| **Red bone marrow** | 0.12 | **7.7%*** |
| **Intestine** | 0.12 | **24.8%** |
| Lungs | 0.12 | 4.4% |
| **Stomach** | 0.12 | **17.1%** |
| Chest | 0.12 | 7.4% |
| **Remaining body** | 0.12 | **9.8%*** |
| **Gonads** | 0.08 | **10.5%** |
| **Urinary bladder** | 0.04 | **11.5%** |
| Esophagus | 0.04 | 1.1% |
| **Liver** | 0.04 | **2.3%** |
| Thyroid glands | 0.04 | 1.6% |
| Bone tissue | 0.01 | 0.8% |
| Brain | 0.01 | 0.1% |
| Salivary glands | 0.01 | 0.3% |
| Skin, total | 0.01 | 0.8% |

*Proportion in the pelvis/abdominal region approx. 50%

If the red bone marrow and the rest of the body in the abdomen are added at 50%, the abdomen accounts for about 75-80% of the whole body dose (effective dose) according to the table above.

In accordance with the present invention, it is therefore preferred to provide particular protection for the pelvic/abdominal region including the gonads.

In a preferred embodiment, the present invention is based on a two-part apron consisting of an inner apron and an outer apron. Due to the additional protection of the lower body by the inner apron, the outer apron may have a lower lead equivalent value, e.g., 0.25 mm instead of the usual 0.35 or 0.50 mm, and thus be considerably lighter.

The partial apron on the lower body, which preferably extends approximately from the gonads to the sternum, protects the major radiation-sensitive organs. For a female examiner wearing a homogeneous 0.35 mm Pb protective apron, Monte Carlo calculations based on the effective dose give a protection factor of 17 (1/17 of the dose she receives without protection) at 100 kV and with the patient lying down. If, on the other hand, she wears an inner apron from the chest to the pubic bone with 0.25 mm Pb and a 0.25 mm Pb outer apron over it, the protection factor is 24, with both variants of the protective garment having approximately the same weight. The protective effect of the new protection concept presented here is therefore approx. 30% higher in the example shown.

The separation into two parts also results in a better weight distribution on the body. The inner apron may support the weight on the hip. The outer apron may support the weight on the shoulder and—using an additional belt—partially on the hip as well. This reduces the load on the shoulder, which particularly affects the spine.

The apron is preferably designed in two parts (inner apron+outer apron).

Alternatively, the apron may also be designed in one piece by reinforcing the apron material in the area of the lower body and/or other areas or body regions.

For instance, the inner apron may be inserted into the outer apron as an additional part, e.g., by means of hook-and-loop strips.

The inner apron may be provided as a kind of miniskirt from (below) the gonads (in men: testicles) to the lower region of the sternum. In the hip region, a belt or stirrup can be provided (similar to a gonadal protective apron).

The protective material may extend upwards from, e.g., the stirrup or belt to the lower base of the sternum as a self-supporting edge.

The upper part of the inner apron may also be designed as a wide belt starting from the hips up to the sternum.

Particularly for females, the inner apron may also be extended with an attachment that covers the breasts.

The lead equivalent value of the inner apron is preferably 0.175 to 0.35 mm Pb, the Pb value of the outer apron is preferably 0.125 to 0.35 mm Pb.

Preferably, the outer and inner aprons or one of them covers 60% of the user's girth on the front side including the body flank.

At the back, e.g., the protection may be omitted from the inner apron and/or the outer apron.

The present invention is particularly based on the combination of two aprons, wherein the inner apron is not to be confused with an apron for the lower body.

As already described above, the high protective effect or cumulative protective effect (or overall protective effect) is achieved only by combining the two garments, i.e., by adding the lead equivalent values in the overlapping area.

The present invention particularly refers to a protective material distribution on the body such that the effective dose (sum of weighted organ doses) is minimized.

As a result of the optimized material distribution, the protective garments may be configured with a lower weight compared to protective garments with homogeneous lead equivalent values.

In a preferred embodiment, the present invention relates to a division of the protective garment into an outer apron and a inner apron, wherein the inner apron is preferably limited to the torso, neck and shoulder joint/upper arm region or parts thereof. The outer apron preferably covers the region from the lower base of the neck to the knee or optionally to the distal end of the pubic bone or optionally an intermediate position between these two. Optionally, the inner or outer apron may also additionally cover the neck (thyroid region) and/or the shoulder joints with or without arm attachment.

The inner apron preferably covers the region of the pubic bone down to below the chest or optionally additionally the chest and/or optionally additionally the region of the thyroid gland and/or additionally the region of the shoulder joint and upper arm.

The high protective effect is preferably achieved by combining both aprons (outer and inner apron).

The inner apron may be divided into zones with different lead equivalent values. Preferably, the region of the pubic bone including the abdomen or optionally including the chest has a lead equivalent value of 0.175 mm or 0.25 mm Pb.

The inner apron preferably has a uniform lead equivalent of preferably 0.25 mm Pb.

The lower apron or first X-ray protective garment is a protective garment in which the protective material rests on the user's skin or clothed skin (protective garment close to the body).

The outer apron or second X-ray protective garment is a protective garment that rests on the side of the inner apron facing away from the body.

In an embodiment of the present invention, an X-ray protective garment is provided for protecting a user from X-rays, the X-ray protective garment consisting of a inner apron resting on the body, said inner apron comprising one or a plurality of protection zones for protecting certain radiation-sensitive organs or certain body regions, and an outer apron resting on the inner apron, the outer and the inner apron providing protection of the entire body against X-rays in accordance with the prior art concerning radiation protection technology.

The protection zones of the inner apron may have a uniform or different lead equivalent values, and the outer apron may have different lead equivalent values for different body regions, preferably a uniform lead equivalent value.

The inner apron may cover the "lower body" protection zones, i.e., pelvis/abdominal area including gonads up to 10 cm below the pubic bone and/or cover the "chest" region and/or the "sternum" region and/or the "thyroid gland" region and/or the "shoulder joints including upper arm" region, and the outer apron may cover the neck base region up to the knees or up to the lower base of the pubic bone or up to an intermediate line.

The inner apron may comprise lead equivalent values of 0.1 to 0.35 mm Pb, preferably 0.175 mm Pb, and the outer apron may comprise lead equivalent values of 0.125 to 0.50 mm Pb, preferably 0.25 mm Pb.

Due to hygiene requirements, the outer apron may be a uniform smooth surface and not an explicit apron.

Thus, the present invention may provide, inter alia, advantageous protection against X-rays at a lower weight. A person skilled in the art may take additional advantageous effects and impacts of the present invention from, inter alia, the following more detailed description of the invention.

Figure 2:
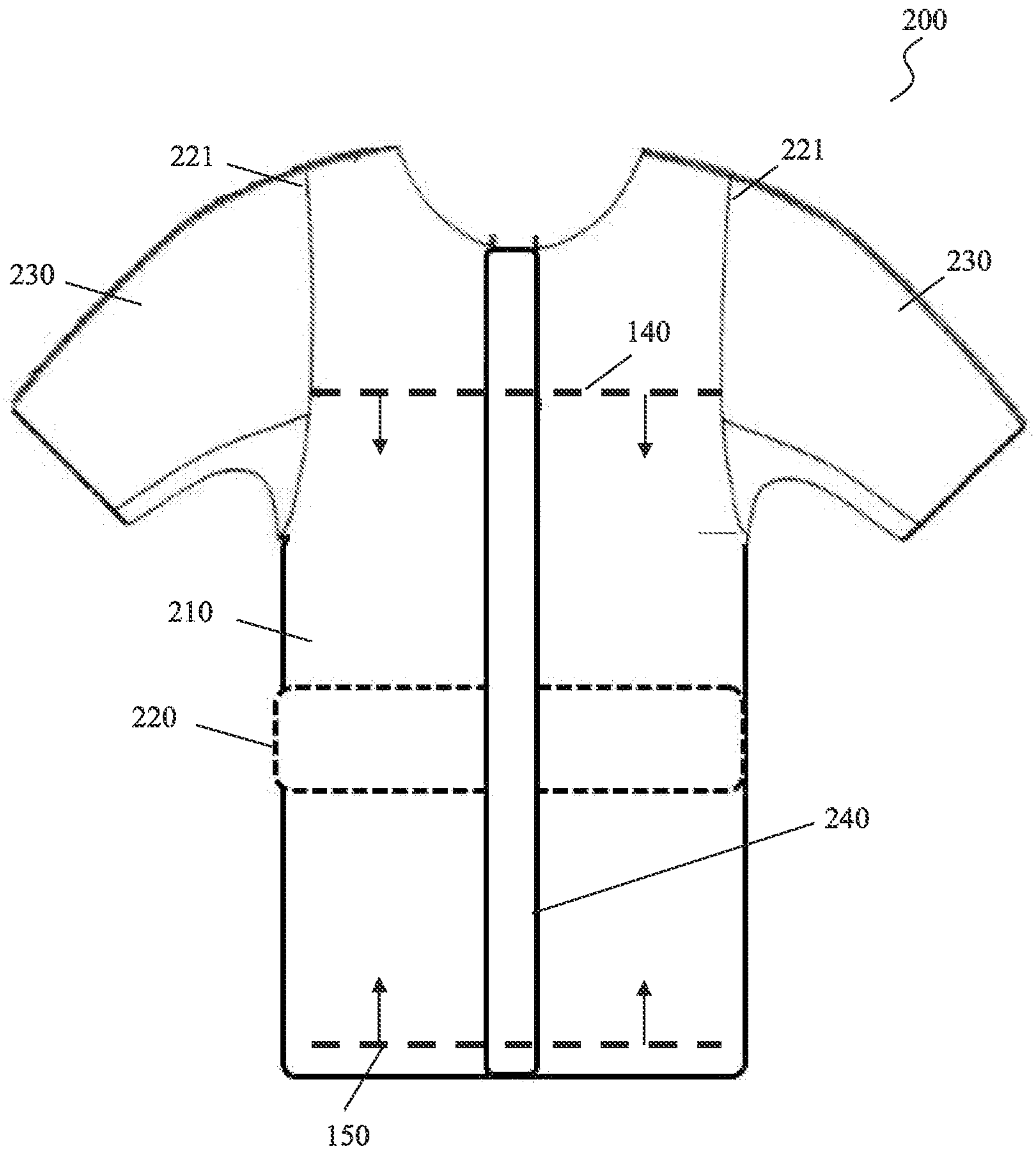

In the following, the present invention will be described in more detail with reference to exemplary embodiments and the figures, in which FIG. 1 shows a schematic view of a first X-ray protective garment (inner apron) according to an embodiment of the invention, and FIG. 2 shows a schematic view of a second X-ray protective garment (outer apron) according to an embodiment of the invention.

A first exemplary embodiment of the X-ray protective garment is described with respect to FIGS. 1 and 2. FIG. 1 shows a first X-ray protective garment 100 (inner apron) in a front view. FIG. 2 shows a second X-ray protective garment 200 (outer apron) in a front view.

The first X-ray protective garment 100 comprises an apron 110 which extends from an upper edge 140 to a lower edge 150. The apron 110 extends from the upper base of the chest to 10 cm below the user's pubic bone. Thus, the apron 110 covers the abdomen and thus at least a large part of the user's radiation-sensitive organs.

The first X-ray protective garment 100 further comprises an inner stretch belt 120. The stretch belt 120 may at least partially support the weight of the first X-ray protective garment 100 on the user's hip.

The first X-ray protective garment 100 further comprises a support device 130 which additionally supports the weight of the first X-ray protective garment 100 on the user's shoulders.

Together, the belt 120 and the support device 130 provide advantageous weight distribution on the user's shoulders and hip (or waist).

The first X-ray protective garment 110 comprises a material with a lead equivalent value of 0.25 mm Pb.

The second X-ray protective garment 200 comprises a main section 210. The second X-ray protective garment 200 further comprises a stretch belt 220 and arm sections 230 which are attached to the main section 210.

The stretch belt 220 may at least partially support the weight of the second X-ray protective garment 200 on the user's hip.

The main section 210 covers the user's torso and defines the portion of the second X-ray protective garment 200 excluding the arm sections 230. The transitions from the main section 210 to the arm sections 230 are indicated by perpendicular lines 221 in the shoulder region.

The weight of the second X-ray protective garment 200 on the user's shoulders may also additionally be supported by the main section 210 and the arm sections 230.

The main section 210 extends from the thyroid gland to 10 cm below the user's pubic bone.

Alternatively, the main section extends from the thyroid gland to the user's knees (not illustrated).

The second X-ray protective garment 200 further comprises a front closure 240 centered on the main section 210 and allowing the user to open and close the second X-ray protective garment 200.

The second X-ray protective garment 200 comprises a uniform lead equivalent value of 0.25 mm Pb.

If the second X-ray protective garment 200 is worn over the first X-ray protective garment 100, a lead equivalent value of 0.5 mm Pb is achieved in the overlapping area. In the exemplary embodiment, the overlapping area corresponds to the length of the first X-ray protective garment 100 and thus extends from the upper base of the chest to 10 cm below the user's pubic bone.

In FIG. 2, the overlapping area is shown with two dashed lines and arrows. The overlapping area extends from the upper dashed line at the level of the upper base of the chest, said line corresponding to the upper edge 140 of the first X-ray protective garment 100 shown in FIG. 1, to the lower dashed line, which corresponds to the upper edge 150 of the first X-ray protective garment 100.

In the embodiment according to FIGS. 1 and 2, the first X-ray protective garment is not flush with the second X-ray protective garment. It is preferred that the first X-ray protective garment 100 covers an area up to about 10 cm below the gonads and the second X-ray protective garment 200 extends to about mid-thigh or the knees.

Alternatively, the first X-ray protective garment 100 may be substantially flush with the second X-ray protective garment 200 (not illustrated).

Increased protection against X-rays is thus achieved in the overlapping area. Since the first and second protective garments 100, 200 each have only half the maximum lead equivalent value, the total weight as well as the weight distribution of the X-ray protective garment may be optimized.

While the present invention has been described and illustrated herein with reference to its preferred embodiments, it will be apparent to those skilled in the art that various modifications and changes may be made thereto without departing from the scope of the invention. In this manner, it is intended that the present invention covers the modifications and changes to the present invention insofar as they fall within the scope of protection of the appended claims and their equivalents. Furthermore, features described in connection with a particular embodiment are not to be understood exclusively in connection with other features of that embodiment. Rather, it is clear that a combination of features from different embodiments is also possible. Also, a feature described in connection with another feature may be present without the other feature in a possible embodiment according to the present invention.

The invention claimed is:

1. An X-ray protective garment for protecting a user against X-rays emitted by an X-ray source, wherein the X-ray protective garment comprises:

a first X-ray protective garment with a first X-ray protective material having a first lead equivalent value; and a second X-ray protective garment with a second X-ray protective material having a second lead equivalent value, wherein the second X-ray protective garment overlaps the first X-ray protective garment in a predetermined area, and wherein the first and second lead equivalent values in addition provide a predetermined protection against X-rays in the predetermined overlapping area, wherein the first X-ray protective garment comprises one or more first support devices configured to support the weight of the first X-ray protective garment on the user's body, wherein the second X-ray protective garment comprises one or more second support devices configured to support the weight of the second X-ray protective garment on the user's body.

2. The X-ray protective garment according to claim 1, wherein the first and/or second X-ray protective garment consists of one single or a plurality of layers.

3. The X-ray protective garment according to claim 1, wherein the first lead equivalent value is smaller than, preferably greater than or equal to, the second lead equivalent value, wherein the first lead equivalent value is preferably Pb 0.10 mm to Pb 1.00 mm and the second lead equivalent value is preferably Pb 0.10 mm to Pb 0.50 mm, wherein the first lead equivalent value is particularly preferably Pb 0.175 mm or Pb 0.25 mm and the second lead equivalent value is particularly preferably Pb 0.25 mm.

4. The X-ray protective garment according to claim 1, wherein the first and/or second X-ray protective garment covers the following regions and/or organs of the user: the intestine and/or the stomach and/or the urinary bladder and/or the gonads and/or the bone marrow and/or the liver and/or the mammary glands and/or the sternum and/or the thyroid gland of the user and/or the lungs and/or the esophagus and/or the shoulder joints and/or the bases of the upper arm, preferably at least on the front side of the user.

5. The X-ray protective garment according to claim 1, wherein the first X-ray protective garment covers at least an area of the pubic bone or the gonads to the lower base of the chest or across a user's chest, wherein the first X-ray protective garment preferably further covers the region of the thyroid gland and/or the region of the shoulder joint and upper arm of the user, and/or wherein the organs of the user covered by the first and second X-ray protective garments correspond to the predetermined overlapping area and/or wherein the region covered by the first X-ray protective garment corresponds to the predetermined overlapping area.

6. The X-ray protective garment according to claim 1, wherein the second X-ray protective garment covers at least a region from the sternum to the knees or a region from the sternum to the gonads or a region from the sternum to a region between the gonads and the knees or a region from the upper abdomen to the gonads or a region from the chest to the gonads of the user, wherein the second X-ray protective garment preferably additionally covers a region from the thyroid gland to the sternum of the user, and/or wherein the first and/or second X-ray protective garment comprises uniform or different zones with uniform or different lead equivalent values and/or the second X-ray protective garment comprises a uniform lead equivalent value, wherein preferably at least one of the zones corresponds to the predetermined overlapping area.

7. The X-ray protective garment according to claim 1, wherein the predetermined overlapping area is disposed on the front side of the user, wherein the second X-ray protective garment and/or the first X-ray protective garment preferably each covers at least 50%, particularly preferably at least 60%, of the girth of the front side of the user, and/or wherein the second X-ray protective garment only partially overlaps the first X-ray protective garment or wherein the second X-ray protective garment substantially completely overlaps the first X-ray protective garment.

8. The X-ray protective garment according to claim 1, wherein the predetermined overlapping area corresponds to at least one region from the pubic bone or the gonads to the sternum of the user, and/or wherein the one or more first support devices are configured to support the weight of the first X-ray protective garment on the user's shoulder and/or waist or hip.

9. The X-ray protective garment according to claim 1, wherein the one or more second support devices are configured to support the weight of the second X-ray protective garment on the user's shoulder and/or waist or hip, and/or the second X-ray protective garment and the first X-ray protective garment are configured as two separate parts.

10. The X-ray protective garment according to claim 1, wherein the second X-ray protective garment is separably connected to the first X-ray protective garment, preferably with a hook-and-loop connection or a zipper connection or a push-button connection, and/or wherein the second X-ray protective garment and/or the first X-ray protective garment are completely or partially free from X-ray protective material at the back of the user.

* * * * *